(12) United States Patent
Lo

(10) Patent No.: US 7,859,309 B2
(45) Date of Patent: Dec. 28, 2010

(54) CLOCK TREE DISTRIBUTING METHOD

(75) Inventor: Chen-Hsing Lo, Hsinchu Hsien (TW)

(73) Assignee: MStar Semiconductor, Inc., Hsinshu Hsien (TW)

( * ) Notice: Subject to any disclaimer, the term of this patent is extended or adjusted under 35 U.S.C. 154(b) by 0 days.

(21) Appl. No.: 12/698,366

(22) Filed: Feb. 2, 2010

(65) Prior Publication Data
US 2010/0295578 A1    Nov. 25, 2010

(30) Foreign Application Priority Data
May 21, 2009    (TW) .............................. 98116921 A

(51) Int. Cl.
*G06F 1/10*    (2006.01)
(52) U.S. Cl. ............................. 326/93; 327/295; 716/10
(58) Field of Classification Search .................... 326/28, 326/82, 93, 101; 327/293–295, 297; 716/10
See application file for complete search history.

(56) References Cited

U.S. PATENT DOCUMENTS

| | | | |
|---|---|---|---|
| 6,429,715 B1 * | 8/2002 | Bapat et al. | 327/295 |
| 6,698,006 B1 * | 2/2004 | Srinivasan et al. | 716/10 |
| 6,701,506 B1 * | 3/2004 | Srinivasan et al. | 716/10 |
| 2007/0286323 A1 * | 12/2007 | Shimobeppu | 375/376 |

* cited by examiner

*Primary Examiner*—Daniel D Chang
(74) *Attorney, Agent, or Firm*—WPAT., P.C.; Justin King

(57) ABSTRACT

A clock tree distribution method is provided. The method, applied to an I/O interface of an integrated circuit, is for generating a clock tree utilized in the I/O interface. The clock tree distribution method includes determining a conversion rate, converting a two-dimensional interface arrangement to a one-dimensional interface arrangement according to the conversion rate, forming a one-dimensional clock tree according to the one-dimensional interface arrangement, generating the clock tree corresponding to the two-dimensional interface arrangement by converting the one-dimensional clock tree according to the conversion rate.

16 Claims, 12 Drawing Sheets

CLOCK TREE DISTRIBUTING METHOD

CROSS REFERENCE TO RELATED PATENT APPLICATION

This patent application is based on Taiwan, R.O.C. patent application No. 098116921 filed on May 21, 2009.

FIELD OF THE INVENTION

The present invention relates to a clock tree distributing method, and more particularly to a clock tree distributing method for generating a clock tree corresponding to an I/O interface of an integrated circuit.

BACKGROUND OF THE INVENTION

Accompanied with the prospering semiconductor and electronic information industries, various integrated circuit components are extensively applied in all sorts of application fields including communication, signal processing, and algorithmic estimation. In a current deep sub-micron manufacturing process, a high performance integrated circuit performs algorithms with an overwhelmingly fast speed, and carries out signal exchange and communication with other components via an I/O interface.

FIG. 1 shows a schematic diagram of an I/O interface of an integrated circuit in the prior art. An I/O interface 10 comprises a plurality of I/O pins 100, each of which has a clock trigger input 1000. The I/O pin 100 receives or transmits data signals according to a received clock trigger.

In practice, the I/O pin 100 of the I/O interface 10 adopts different clocks according to the nature of signals and the recipient of signal transmission. As shown in FIG. 1, there are a first clock signal Clk, a second clock signal Clk2, and a third clock signal Clk3. The I/O pins responding to the Clk are marked as Data; the I/O pins responding to the clock signal Clk2 are marked as Data2; and the I/O pins responding the clock signal Clk3 are marked as Data3. More specifically, the clock signal Clk, Clk2, or Clk3 needs to be electrically connected to the clock trigger input of the I/O pin 100 marked as Data, Data2, or Data3 to drive and control signal reception and transmission at the particular I/O pin 100.

FIG. 2 shows a schematic diagram illustrating a relationship between the clock signal Clk and the I/O interface 10. As shown, the clock signal Clk is connected through a plurality of independent wires to each of the I/O pins 100 (marked as Data) that need the clock signal Clk. Such clock distributing method is indeed rather simple, however, as observed from FIG. 2, lengths of the wires between I/O pins and the clock input are quite different, which means that certain clock differences may exist between the I/O pins to lead to an issue that data signals are not received and transmitted in synchronization. Further, on top of putting a burden on the space required for laying out the wires, the great amount of independent wires also increases manufacturing cost.

Therefore, an available common solution for overcoming the above drawbacks is providing a clock tree that corresponds to the I/O interface, and clock triggers are then respectively transmitted to the I/O pins of the I/O interface via the clock tree. In the design of the clock tree, load balance, time deviation, routing rules and wire characteristics (e.g., wire lengths, driving capabilities and slew rate) are taken into consideration. In addition, an I/O interface is generally a two-dimensional structure such as the U-shape shown in FIG. 1 but not a simple linear arrangement, so that the design of a corresponding clock tree becomes even more difficult.

In some existing high-speed I/O interfaces such as SSTL2 (i.e., DDR2), SSTL3 (i.e., DDR3), Serial Advanced Technology Attachment (SATA) and Peripheral Component Interconnect Express (PCIe), transmission rate unceasingly increases such that standards for clock signals are also continuously raised.

To solve the abovementioned drawbacks, according to the invention, a clock tree distributing method for establishing a clock tree is provided, wherein the established clock tree is capable of achieving clock balance of a high-speed I/O interface.

SUMMARY OF THE INVENTION

It is an objective of the invention to provide a clock tree distributing method, applied to an I/O interface of an integrated circuit, for establishing a clock tree for the I/O interface in a two-dimensional arrangement such as a U-shape or an L-shape.

According to one embodiment of the invention, the clock tree distributing method comprises determining a conversion rate, converting a two-dimensional interface arrangement to a one-dimensional interface arrangement (e.g., a linear arrangement) according to the conversion rate, forming a one-dimensional clock tree according to the one-dimensional interface arrangement, and generating the clock tree corresponding to the two-dimensional interface arrangement by converting the one-dimensional clock tree according to the conversion rate.

For example, the foregoing conversion rate is determined according to wire resistance, wire capacitance, and routing rules of the integrated circuit. In this embodiment, the I/O interface comprises a plurality of I/O pins, to which the clock tree provides synchronized clock signals. Through the balanced clock tree, clock skews at the I/O interface are reduced.

According to another embodiment of the invention, the clock tree distributing method comprises determining a conversion rate, converting a two-dimensional interface arrangement to a one-dimensional interface arrangement according to the conversion rate, forming a one-dimensional clock tree according to the one-dimensional interface arrangement, generating the clock tree corresponding to the two-dimensional interface arrangement by converting the one-dimensional clock tree according to the conversion rate, and placing cascading delay stages between the clock tree and the I/O interface.

In this embodiment, the I/O interface comprises a plurality of I/O pins, to which the clock tree in conjunction with the cascading delay stages provides programmable, unsynchronized clock signals. Through the balanced clock tree and the programmable cascading delay stages, clock skews at the I/O interface are controlled while noises of power bouncing resulted from simultaneously switching I/O interfaces are reduced. More specifically, the clock tree distributing method of the invention is capable of generating a clock tree that corresponds to a two-dimensional I/O interface and generating clock signals needed by the I/O interface through the clock tree.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

In a current integrated circuit, in order to transmit a maximum amount of data while also preventing mutual signal interferences, an I/O interface is mostly located at edges of the integrated circuit to form a two-dimensional I/O interface arrangement. To be able to meet synchronization requirements of high-frequency signals, the I/O interface need an ideal clock tree for correspondingly providing accurate clock signals. However, in practice, designing a balanced clock tree for a two-dimensional arrangement and I/O pins that have different relative distances from one another can be extremely challenging.

Figure 1:
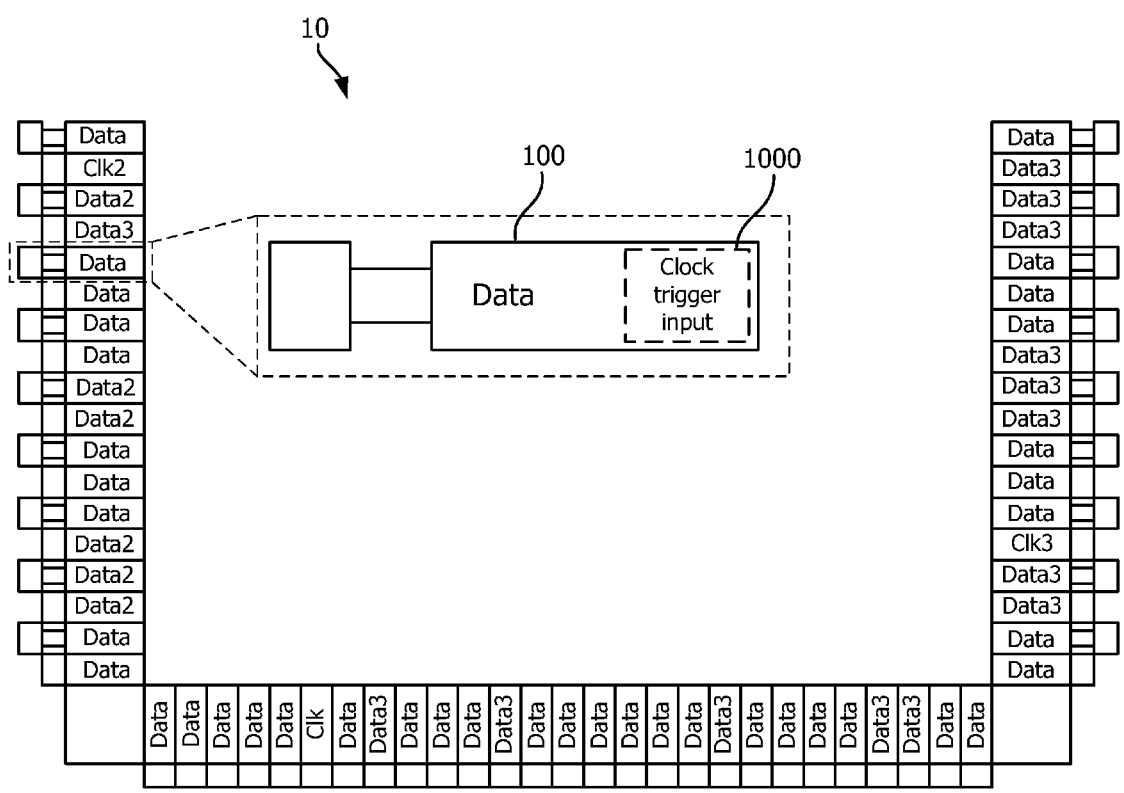
FIG. 1 is a schematic diagram of an I/O interface of an integrated circuit of the prior art.
Figure 2:
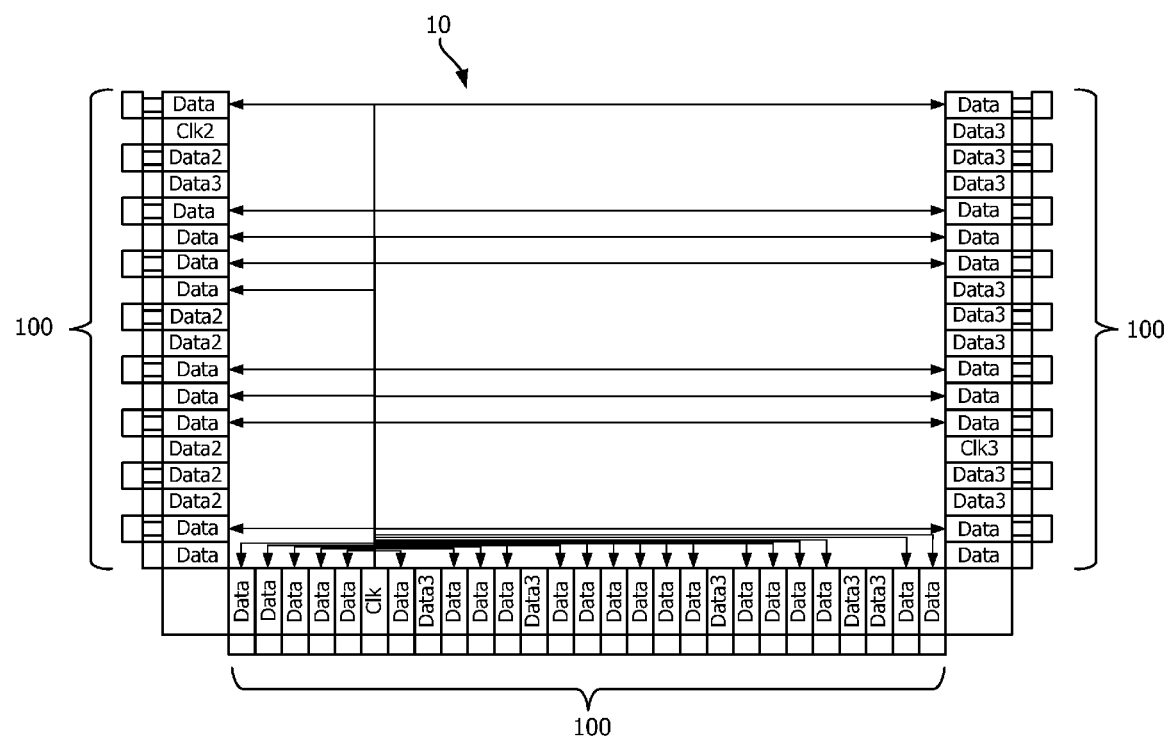
FIG. 2 is a schematic diagram illustrating a relationship between a clock signal and an I/O interface of the prior art.
Figure 3:
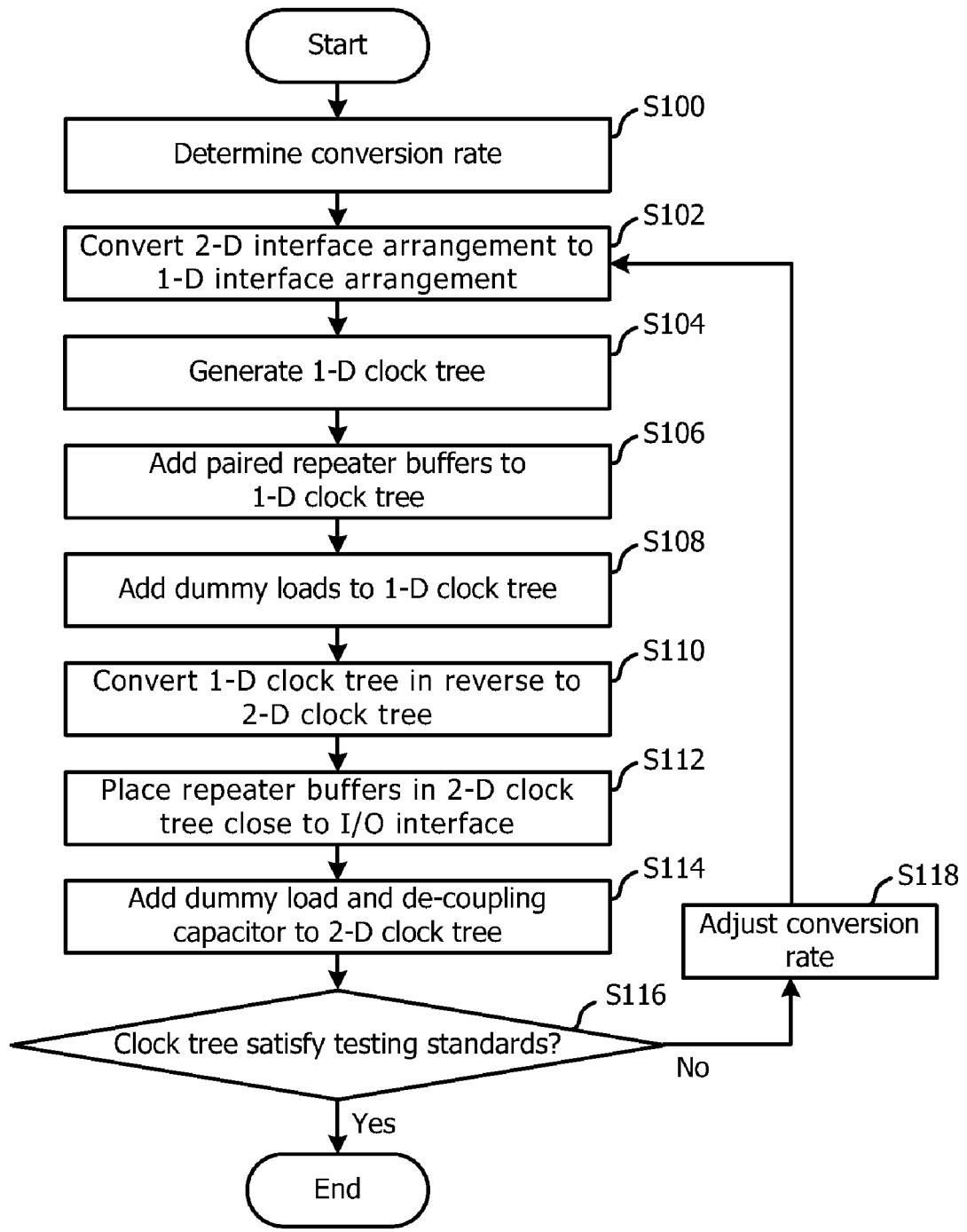
FIG. 3 is a flowchart of a clock tree distributing method according to a first embodiment of the invention.
Figure 4:
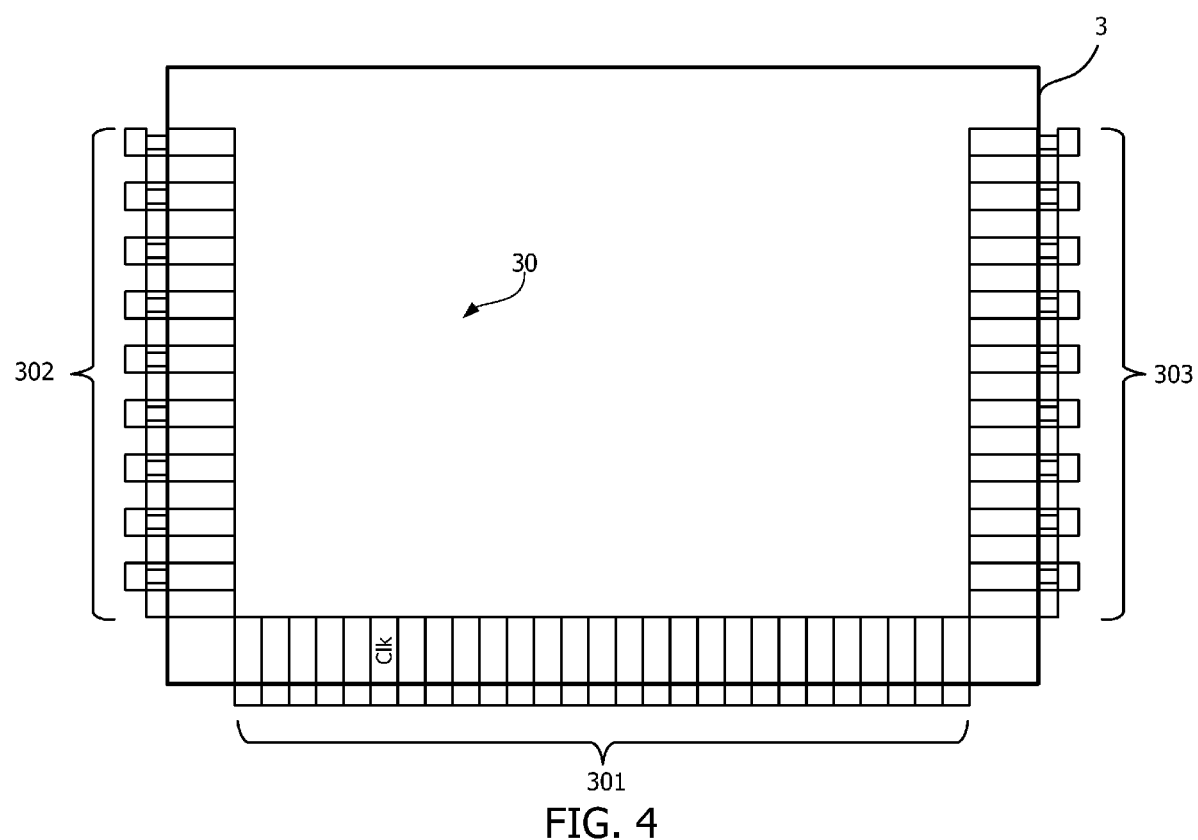
FIG. 4 is a schematic diagram of a two-dimensional arrangement of an I/O interface according to the first embodiment of the invention.

With reference to FIGS. 3 and 4, FIG. 3 shows a flowchart of a clock tree distributing method according to a first embodiment of the invention; FIG. 4 shows a schematic diagram of a two-dimensional arrangement of an I/O interface 30 according to the first embodiment of the invention.

As shown in FIG. 4, in this embodiment, the I/O interface 30 in a two-dimensional arrangement comprises a first plurality of I/O pins 301, a second plurality of I/O pins 302 and a third plurality of I/O pins 303.

The first plurality of I/O pins 301 are in a first-direction arrangement. The second plurality of I/O pins 302 and the third plurality of I/O pins 303 are in a second-direction arrangement perpendicular to the first-direction arrangement, and are respectively located at two sides of the first plurality of I/O pins 301. In this embodiment, for example, the first-direction arrangement is a horizontal arrangement, and the second-direction arrangement is a vertical arrangement, and both shall be referred to as such in the description below. Accordingly, the second plurality of I/O pins 302, the first plurality of I/O pins 301, and the third plurality of I/O pins 303 in sequence form a U-shaped two-dimensional interface arrangement.

In another embodiment according to the invention, the I/O interface may also be an L-shaped two-dimensional interface arrangement comprising a first plurality of I/O pins in a first-direction arrangement (e.g., a horizontal arrangement) and a second plurality of I/O pins in a second-direction arrangement (e.g., a vertical arrangement). The U-shaped arrangement in FIG. 4 according to the first embodiment is merely taken as an example and is not meant to limit the invention thereto.

With reference to FIG. 3, the clock tree distributing method according to the invention starts with Step 100 to determine a conversion rate. In Step S102, according to the conversion rate from Step S100, the I/O interface 30 in the two-dimensional interface arrangement is converted to a one-dimensional arrangement.

Figure 5A:
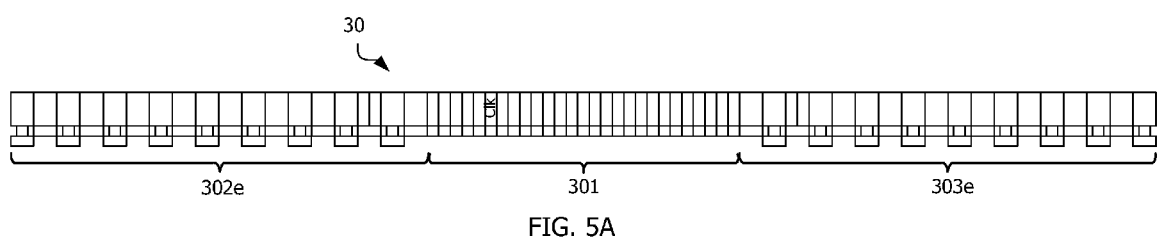
FIG. 5A is a schematic diagram of a one-dimensional interface arrangement formed using a conversion ratio of 2.
Figure 5B:
FIG. 5B is a schematic diagram of a one-dimensional interface arrangement formed using a conversion ratio of 0.5.
Figure 5C:
FIG. 5C is a schematic diagram of a one-dimensional interface arrangement formed using a conversion ratio of 1.

To get a better understanding of Step S102 in which the two-dimensional interface arrangement is converted into the one-dimensional interface arrangement, FIGS. 5A to 5C illustrate schematic diagrams of examples of one-dimensional interface arrangements converted using different conversion rates.

Taking FIG. 5A for example, the one-dimensional interface arrangement is formed using a conversion ratio of 2. More specifically, in Step S102, according to the conversion rate, the width of the second plurality of I/O pins 302 and the third plurality of I/O pins 303 both in a vertical arrangement is multiplied by 2 to form a second plurality of I/O pins 302e and a third plurality of I/O pins 303e. The second plurality of I/O pins 302e and the third plurality of I/O pins 303e are respectively arranged in horizontal at the two sides of the first I/O pins 301 to form the one-dimensional interface arrangement, as shown in FIG. 5A.

In addition, FIG. 5B shows an I/O interface 30' in a one-dimensional interface arrangement using a conversion rate of 0.5; FIG. 5C shows an I/O interface 30" in a one-dimensional interface arrangement using a conversion rate of 1.

The conversion rate is determined according to wire resistance, wire capacitance and routing rules of the integrated circuit 3. The wire resistance reflects different thicknesses of wiring layers during the manufacturing process, the wire capacitance reflects different distances between every two adjacent wires during the manufacturing process, and routing rules are common standards for the smallest width and the smallest spacing in the routing process. A manufacturing example shall be given below. For example, when a fifth metal layer M5 is taken as a horizontal wiring layer and a metal top layer MT taken as a vertical wiring layer from a metal wire process, a conversion rate therefor is approximately 0.95; when a third metal layer M3 is taken as a horizontal wiring layer and a fourth metal layer M4 taken as a vertical wiring layer from a metal wire process, a conversion rate therefor is approximately 1.

Figure 6:
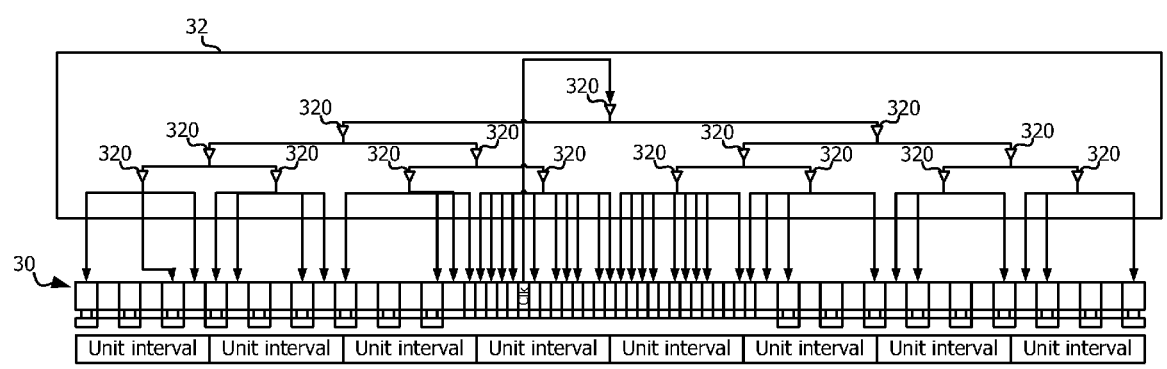
FIG. 6 is a schematic diagram of a one-dimensional clock tree corresponding to the one-dimensional interface arrangement.

The method next proceeds to Step S104 to generate a one-dimensional clock tree according to the one-dimensional interface arrangement. FIG. 6 shows a schematic diagram of a one-dimensional clock tree 32 corresponding to the one-dimensional interface arrangement. In this embodiment, the one-dimensional clock tree 32 may correspond to the first one-dimensional interface arrangement shown in FIG. 5A by adopting a form of a balanced binary tree. As shown in FIG. 6, the one-dimensional interface arrangement is divided into 8 unit intervals, and the one-dimensional clock tree 32 comprises a plurality of nodes of the binary tree. In the balanced binary tree, the nodes are located at four different layers, which respectively include 1, 2, 4 and 8 nodes, and the nodes at a lowermost layer correspond to the 8 unit intervals. In this embodiment, each node is provided with a repeater buffer 320. The repeater buffers 320 are for amplifying clock signals that pass through so that the clock signals are prevented from distortion caused by insufficient slew rate or capacitance effects during transmission.

It is to be noted that, the one-dimensional clock tree 32 according to the invention is generated using a balanced clock tree; that is, all transmission paths along the wires from an input at the node at the uppermost layer to the nodes at the lowermost layer are equal in length and pass through the same number of repeater buffers. The only difference among the clock signal transmission paths is that, wire lengths from the lowermost nodes to the I/O pins in the corresponding intervals are slightly varied, with the lengths difference being smaller than the size of the intervals, however. In FIG. 6, the one-dimensional clock tree according to this embodiment is divided into 4 layers, of which the lowermost layer includes 8 nodes. In another embodiment, the lowermost layer may include 16 nodes to correspond to 16 intervals. Therefore, through the concept of unit intervals, the differences in the wires are kept small and thus considered negligible so that synchronization of the clock signals are not undesirably affected.

Figure 7:
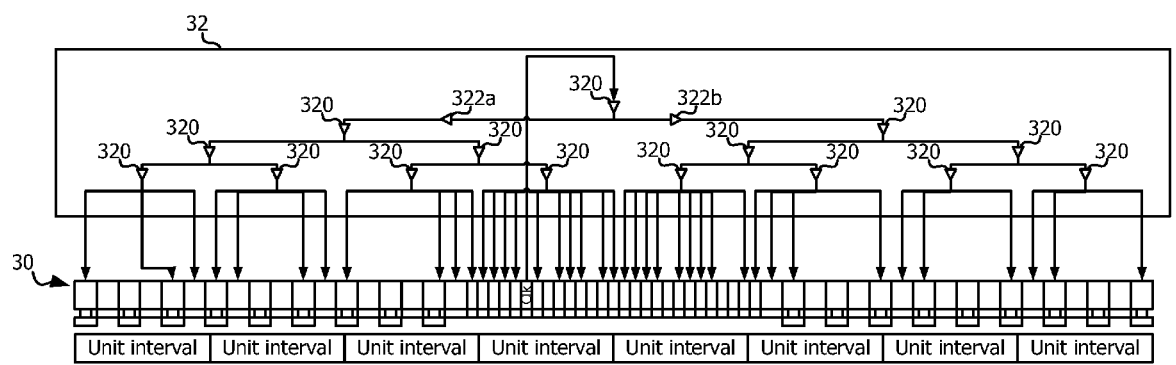
FIG. 7 is a schematic diagram of the one-dimensional clock tree in FIG. 6 further placed with repeater buffers.

FIG. 7 shows a schematic diagram of the one-dimensional clock tree 32 in FIG. 6 further placed with repeater buffers. After the one-dimensional clock tree 32 is generated, the clock tree distributing method according to the invention proceeds to Step S106. In Step S106, repeater buffers in pair, for example, a first repeater buffer 322a and a second repeater buffer 322b, are added to the one-dimensional clock tree 32, as shown in FIG. 7. The first repeater buffer 322a and the second repeater buffer 322b are added between two nodes and are located opposite to each other. Without affecting synchronization of the clock signals, the additional repeater buffers in pair prevent signal distortion resulted from excessive wire lengths. In practice, instead of the two repeater buffers as shown in FIG. 7, more repeater buffers in pair may be added to corresponding positions in the one-dimensional clock tree according to wire lengths or signal requirements.

Figure 8:
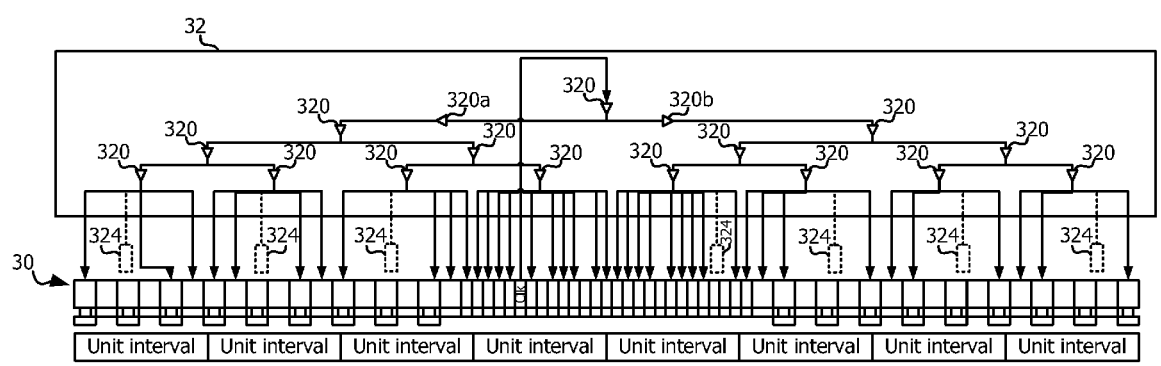
FIG. 8 is a schematic diagram of the one-dimensional clock tree in FIG. 7 added with dummy loads.

With reference to FIG. 8, the clock tree distributing method according to the invention further proceeds to Step S108. FIG. 8 shows a schematic diagram of the one-dimensional clock tree in FIG. 7 added with dummy loads. In Step S108, dummy loads 324 are added to the one-dimensional clock tree 32 to balance loads between the various unit intervals, as shown in FIG. 8. The dummy loads 324 are added to balance the I/O pins in different unit intervals to be driven, and therefore the dummy loads 324 at different unit intervals may correspondingly have different equivalent load values.

In another embodiment, supposing one of the repeater buffers is not connected to an I/O pin that needs to be driven, this particular repeater buffer may be replaced by a dummy load. For example, supposing one of the unit intervals does not include any I/O pins that need to be driven, the repeater buffers within this particular unit interval may be removed and replaced by dummy loads having equivalent load values.

Therefore, the one-dimensional clock tree correspondingly generated by the one-dimensional interface arrangement according to the invention ensures that the clock signals are synchronized and unaffected by delay time of repeater buffers or wire lengths. Further, the dummy loads are added to balance the load value corresponding each of the repeater buffers to better enhance the balance of the clock tree.

Figure 9:
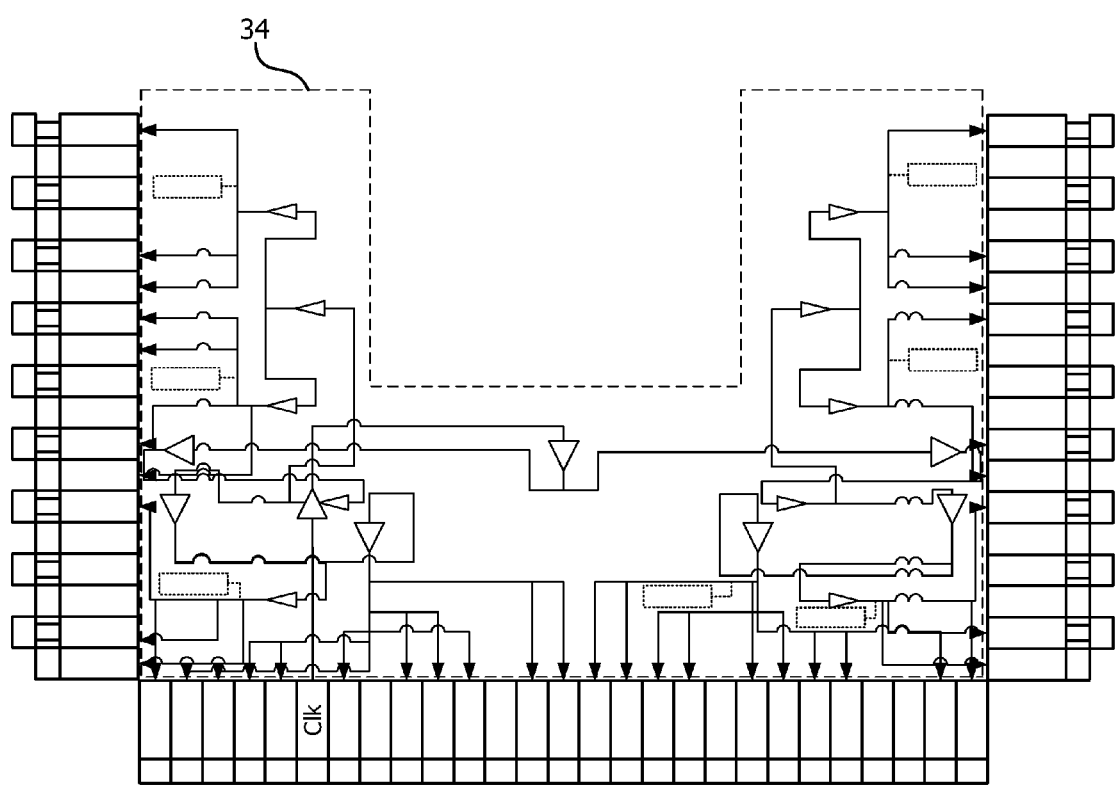
FIG. 9 is a schematic diagram of a clock tree generated by converting the one-dimensional clock tree shown in FIG. 8.

According to the first embodiment of the invention, the clock tree method proceeds to Step S110. With reference to FIG. 9 showing a schematic diagram of a clock tree 34 converted in reverse from the one-dimensional clock tree 32 shown in FIG. 8, according to the determined conversion rate, the one-dimensional interface arrangement is converted in reverse to the original two-dimensional interface arrangement shown in FIG. 4. More specifically, in Step S110, the one-dimensional clock tree 32 corresponding to the one-dimensional interface arrangement is converted in reverse according to the determined conversion rate to the clock tree 34 corresponding to the two-dimensional interface arrangement.

Therefore, by utilizing the clock tree distribution method according to the invention, the clock tree 34 corresponding to the two-dimensional interface arrangement is generated to ensure synchronization of clock signals.

Figure 10:
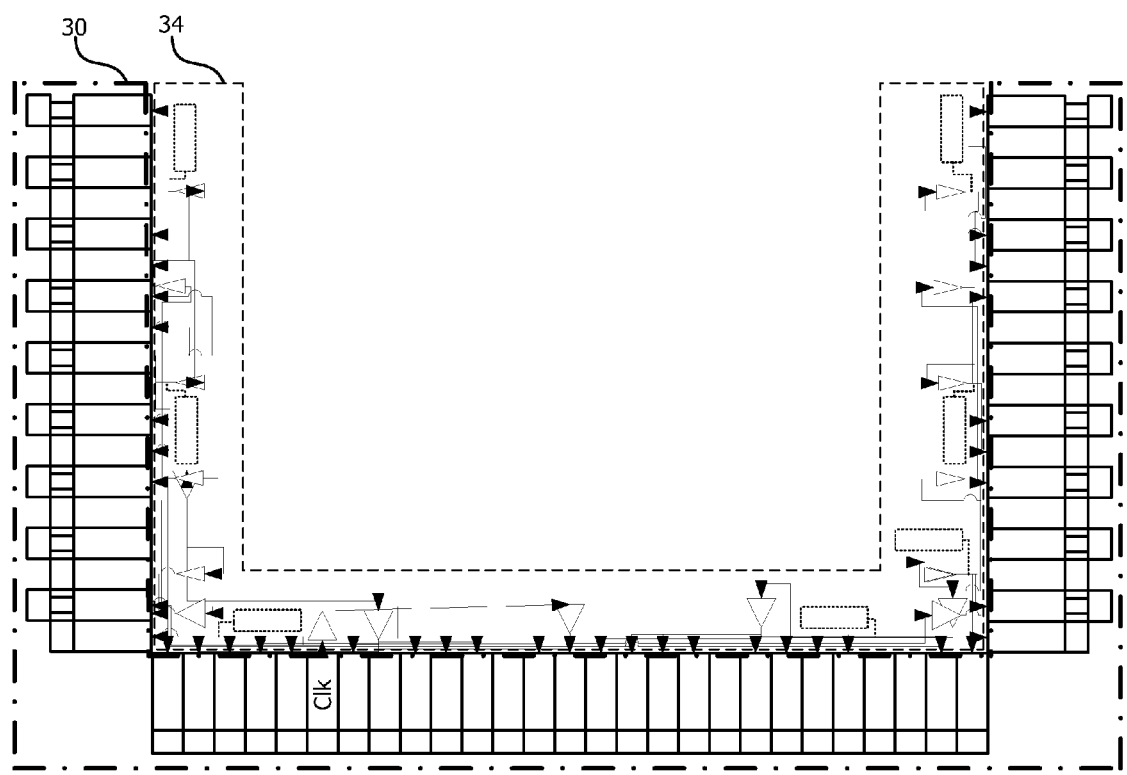
FIG. 10 is another schematic diagram of the clock tree in FIG. 9.

FIG. 10 shows a schematic diagram of the clock tree 34 in FIG. 9. In Step S112, to meet manufacturing requirements, the repeater buffers and wires in the clock tree 34 are placed closely to the I/O interface 30, as shown in FIG. 10. In next Step S114, dummy loads and decoupling capacitors are placed around the repeater buffers. For example, the repeater buffers in the clock tree 34 may impose interference on the clock signals due to manufacturing errors or environmental factors. Hence, in Step 114, the dummy loads and decoupling capacitors are placed to reduce undesirable effects from such manufacturing errors and environmental factors, so that the stability of the clock tree generated by the clock tree distributing method according to the invention is further enhanced.

The clock tree distribution method according to the invention then proceeds to Step S116 to test whether clock skew and latency of the clock tree meets test standards. When test results are affirmative, the synchronized clock tree distribution is completed; conversely, when the test results are negative, Step S118 is performed to adjust the conversion rate according to the test results and electrical characteristics, followed by returning to Step S102, until the generated clock tree meets expected clock requirements.

With the foregoing embodiment, compared to the prior art, the clock tree distribution method of the invention, via conversion between the one-dimensional interface arrangement and the two-dimensional interface arrangement, is capable of generating a clock tree that ensures synchronization of clock signals to satisfy requirements of the I/O interface.

However, it is to be noted that, in practice, when I/O signals at the I/O interface are switched simultaneously, noises from power bouncing are incurred—such noises are particularly influential on performance and stability of a high-frequency communication circuit. Therefore, in a second embodiment according to the invention, the clock tree distribution method may further add a user-defined cascading delay stage to the balance clock tree generated, so as to solve the power bouncing by utilizing controllable non-synchronized clock signals to the I/O pins produced by the cascading delay stage.

Figure 11:
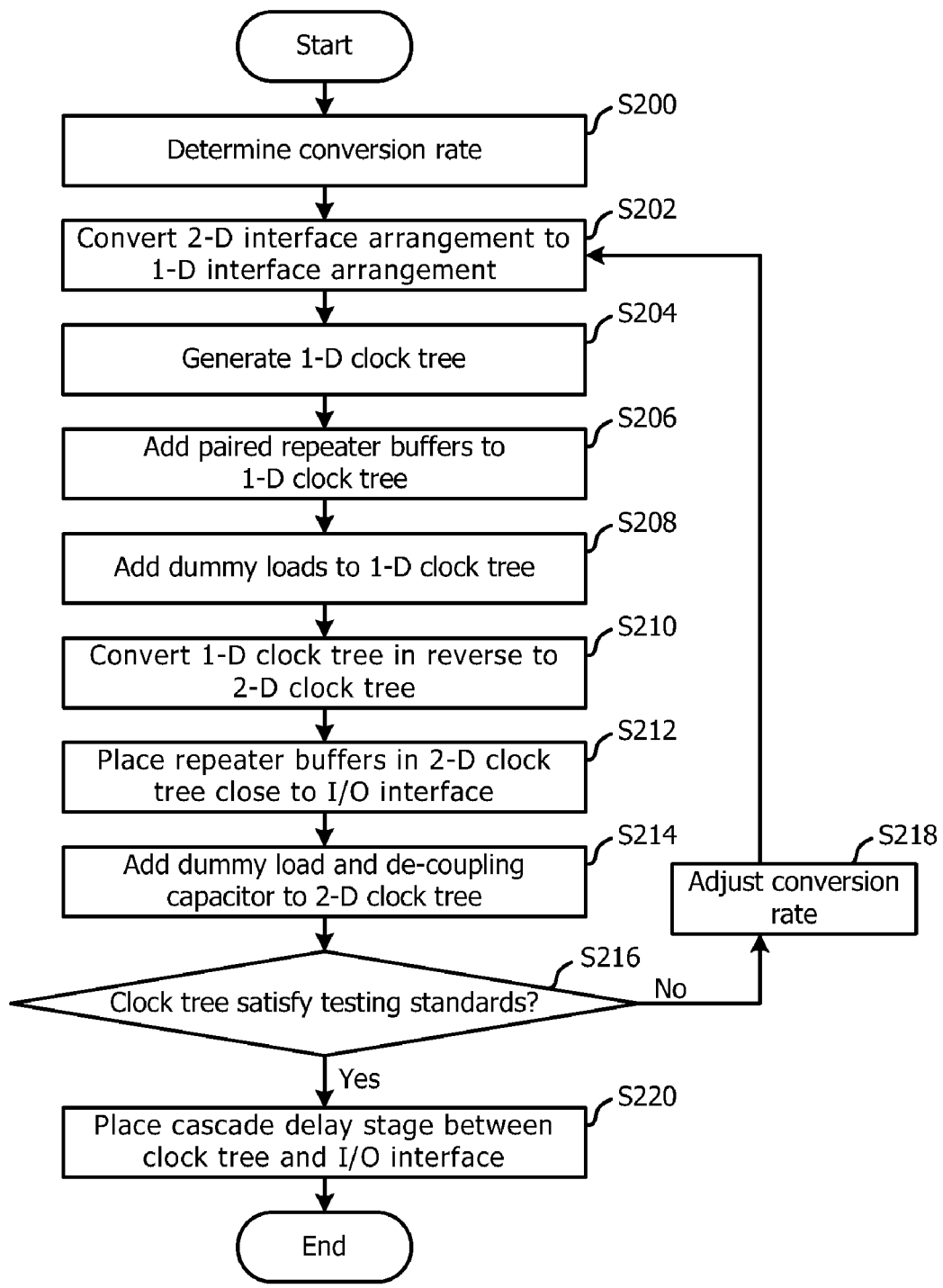
FIG. 11 is a flowchart of a clock tree distribution method according to a second embodiment of the invention.
Figure 12:
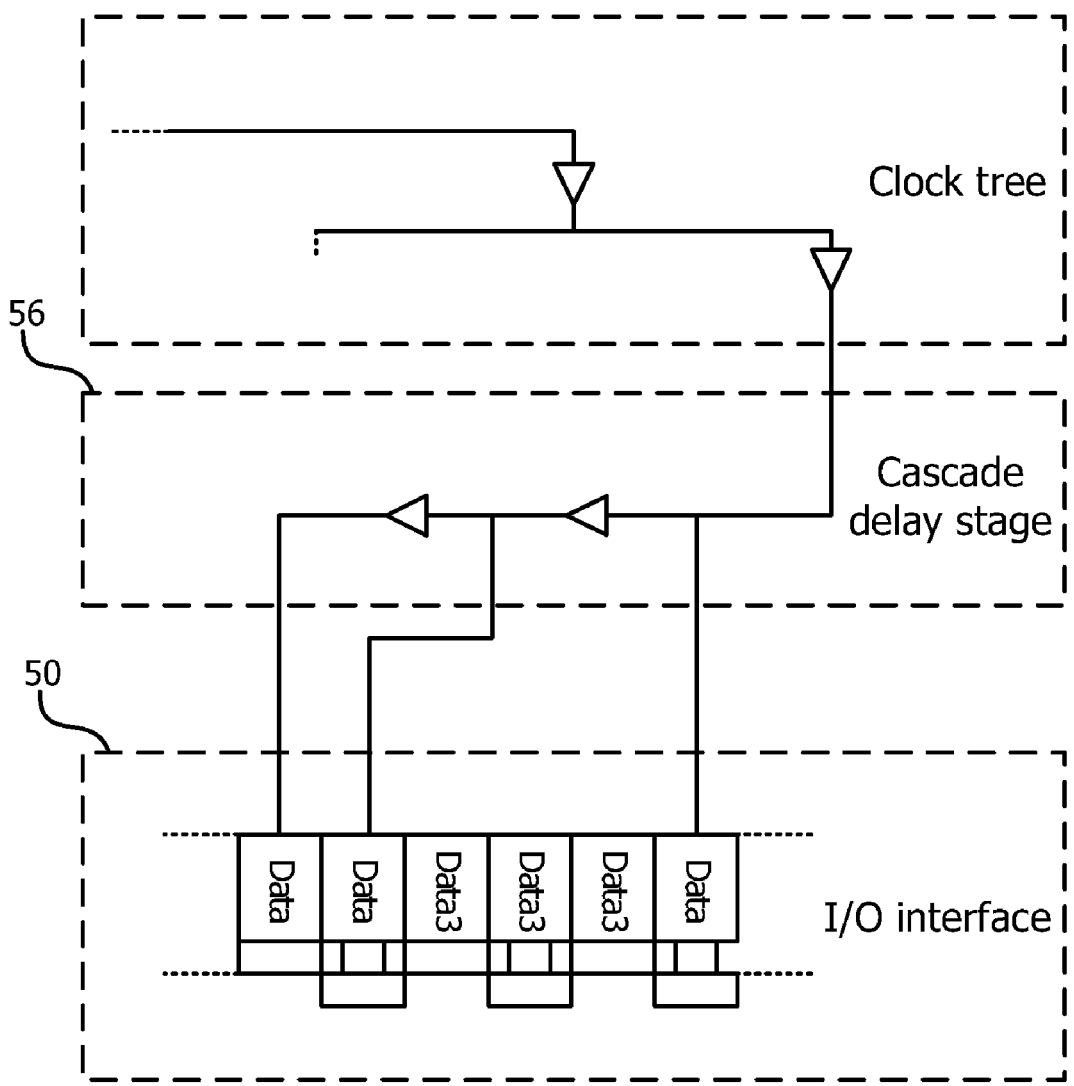
FIG. 12 is a schematic diagram of a cascading delay stage in the second embodiment.

FIG. 11 shows a flowchart of a clock tree distribution method according to a second embodiment of the invention. FIG. 12 shows a schematic diagram of a cascading delay stage 56 in the second embodiment. One of the major differences between the first and second embodiments is that, the second embodiment further comprises Step 220 after generating the clock tree to place the controllable cascading delay stage 56 between the clock tree and an I/O interface 50.

In this embodiment, the cascading delay stage 56 comprises a plurality of serially connected components having a predetermined clock delay. As shown in FIG. 12, the cascading delay stage 56 comprises two buffers having controllable clock delays; for example, two buffers with a lower driving power and small clock delays are be used. Accordingly, through the cascading delay stage 56, the clock signals generated from the clock tree are provided to the I/O interface 50 in a non-synchronized manner. That is, since small programmable differences exist between the clock signals received by the I/O pins of the I/O interface 50, the issue of power bouncing resulted from simultaneous signals is eliminated. In practice, the number of buffers in the cascading delay stage 56 may be decided upon corresponding I/O pins but not limited to the two buffers shown in FIG. 10.

Therefore, with description of the embodiments, the clock tree distribution method of the invention is capable of providing synchronized clock signals or controllable non-synchronized clock signals to an I/O interface in a two-dimensional arrangement.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A clock tree distributing method, applied to an I/O interface of an integrated circuit, for generating a clock tree utilized in the I/O interface comprising a two-dimensional interface arrangement, the method comprising:
   determining a conversion rate;
   converting the two-dimensional interface arrangement of the I/O interface to a one-dimensional interface arrangement according to the conversion rate;
   forming a one-dimensional clock tree according to the one-dimensional interface arrangement;
   generating a two-dimensional clock tree corresponding to the two-dimensional interface arrangement by converting the one-dimensional clock tree according to the conversion rate.

2. The clock tree distributing method as claimed in claim 1, wherein in the step of determining the conversion rate determines the conversion rate according to a wire resistance value, a wire capacitance value, and a routing rule of the integrated circuit.

3. The clock tree distributing method as claimed in claim 1, wherein the I/O interface in the two-dimensional interface arrangement comprises a first plurality of first-direction I/O pins and a second plurality of second-direction I/O pins, and the first plurality of I/O pins and the second plurality of I/O pins form an L-shaped arrangement.

4. The clock tree distributing method as claimed in claim 3, wherein the step of converting the two-dimensional interface arrangement of the I/O interface to the one-dimensional interface arrangement according to the conversion rate further comprises:
   converting the second plurality of second-direction I/O pins to a second plurality of first-direction I/O pins according to the conversion rate; and
   placing the second plurality of first-direction I/O pins adjoining to the first plurality of first-direction I/O pins to form the one-dimensional interface arrangement.

5. The clock tree distributing method as claimed in claim 1, wherein the I/O interface in the two-dimensional interface arrangement further comprises:
   a first plurality of first-direction I/O pins;
   a second plurality of second-direction I/O pins; and
   and a third plurality of second-direction I/O pins;
   wherein the second plurality of second-direction I/O pins and the third plurality of second-direction I/O pins are respectively located at two sides of the first plurality of first-direction I/O pins to form a U-shaped arrangement.

6. The clock tree distributing method as claimed in claim 5, wherein the step of converting the two-dimensional interface arrangement of the I/O interface to the one-dimensional interface arrangement according to the conversion rate further comprises:
   converting the second plurality of second-direction I/O pins and the third plurality of second-direction I/O pins to a second plurality of first-direction I/O pins and a third plurality of first-direction I/O pins, respectively; and
   placing the second plurality of first-direction I/O pins and the third plurality of first-direction I/O pins adjoining to the sides of the first plurality of first-direction I/O pins, respectively, to form the first I/O interface arrangement.

7. The clock tree distributing method as claimed in claim 1, wherein in the step of forming the one-dimensional clock tree according to the one-dimensional interface arrangement, the formed one-dimensional clock tree comprises a plurality of nodes in a binary tree arrangement.

8. The clock tree distributing method as claimed in claim 7, wherein each of the nodes is placed with a repeater buffer.

9. The clock tree distributing method as claimed in claim 7, wherein the step of forming one-dimensional clock tree according to the one-dimensional interface arrangement comprises:
   placing a first repeater buffer between a first node and a second node of the plurality of nodes in the one-dimensional clock tree; and
   placing a second repeater buffer between the first node and a third node of the plurality of nodes in the one-dimensional clock tree, wherein the second repeater buffer is placed correspondingly opposite to the first repeater buffer.

10. The clock tree distributing method as claimed in claim 1, before the step of generating the two-dimensional clock tree corresponding to the two-dimensional interface arrangement, further comprises:
    placing a dummy load to the one-dimensional clock tree.

11. The clock tree distributing method as claimed in claim 1, wherein the one-dimensional clock tree comprising a plurality of repeater buffers, and after the step of generating the two-dimensional clock tree corresponding to the two-dimensional interface arrangement, the method further comprising:
    positioning the plurality of repeater buffers in the two-dimensional clock tree closely to the I/O interface.

12. The clock tree distributing method as claimed in claim 11, after the step of generating the two-dimensional clock tree corresponding to the two-dimensional interface arrangement, the method further comprises:
    placing a dummy load and a decoupling capacitor corresponding to the plurality of repeater buffers in the two-dimensional clock tree.

13. The clock tree distributing method as claimed in claim 1, after the step of generating the two-dimensional clock tree corresponding to the two-dimensional interface arrangement, further comprises:
    testing whether a clock skew and a latency of the two-dimensional clock tree meet a test standard; and
    adjusting the conversion rate and returning to the step of converting the two-dimensional interface arrangement of the I/O interface to the one-dimensional interface arrangement according to the adjusted conversion rate when a test result is negative.

14. The clock tree distributing method as claimed in claim 1, wherein the I/O interface comprises a plurality of I/O pins, and the two-dimensional clock tree is utilized to provide a synchronized clock signal to the plurality of I/O pins.

15. The clock tree distributing method as claimed in claim 1, after the step of the step of generating the two-dimensional clock tree corresponding to the two-dimensional interface arrangement, further comprises:

placing a serially connected cascading delay stage between the two-dimensional clock tree and the I/O interface.

16. The clock tree distributing method as claimed in claim 15, wherein the I/O interface comprises a plurality of I/O pins, and the cascading delay stage in conjunction with the two-dimensional clock tree provides a controllable, non-synchronized clock signal to the plurality of I/O pins.

* * * * *